United States Patent Office 3,580,939
Patented May 25, 1971

3,580,939
AMINOSILANES AND COMPOSITIONS
CONTAINING THEM
Louis Ceyzeriat, Lyon, and Maurice Gaignon and Marcel Lefort, Rhone, France, assignors to Rhone-Poulenc S.A., Paris, France
No Drawing. Filed Apr. 22, 1968, Ser. No. 723,250
Claims priority, application France, May 9, 1967, 105,751
Int. Cl. C07f 7/10
U.S. Cl. 260—448.2N
2 Claims

ABSTRACT OF THE DISCLOSURE

The invention provides new trisaminosilanes containing a 2,2 - dichlorocyclopropyl group and organopolysiloxane compositions containing the same as cross-linking agents which are storage-stable in the absence of moisture but cure rapidly at ambient temperature in the presence of moisture.

---

The present invention relates to organosilicon compositions which may be stored in the absence of water, but which vulcanise very rapidly even at ambient temperature to give elastic solids under the action of water in liquid or vapour form, and which contain an organotriaminosilane as crosslinking agent.

Organosilicon compositions which are stable on storage in a hermetically enclosed space but which harden spontaneously at ambient temperature in the presence of water in liquid or gaseous form, which consist of a dihydroxylated diorganopolysiloxane and an aminosilane, are described in French Pat. No. 1,248,826. However, the hardening of such compositions, is fairly slow unless an additional catalyst is added to them.

It has now been found that if the crosslinking agent used is an organotriaminosilane containing the 2,2-dichlorocyclopropyl radical, the hardening of the compositions on contact with moisture is much more rapid.

The aminosilanes which can be used in the new compositions have the formula:

$$R^1Si(NR^2R^3)_3 \qquad (I)$$

where $R^1$ is 2,2-dichlorocyclopropyl or a monovalent organic radical containing a 2,2-dichlorocyclopropyl radical, and $R^2$ and $R^3$ are the same or different and are hydrogen or saturated or unsaturated hydrocarbon radicals of up to 15 carbon atoms, or $R^2$ and $R^3$ are linked to form a heterocyclic ring which may contain a second heteroatom in addition to the indicated nitrogen.

The compositions of the present invention comprise (A) a diorganopolysiloxane of the formula:

$$\text{HO}\!\left[\!\begin{array}{c}R\\|\\ \text{SiO}\\|\\ R\end{array}\!\right]_{\!n}\!\!R^4 \qquad (II)$$

in which the symbols R are the same or different and represent inert, substituted or unsubstituted monovalent hydrocarbon radicals, $R^4$ represents hydrogen or the group —Si(R)$_3$ and $n$ is an integer from 10 to 10,000 and (B) an aminosilane of Formula I. By "inert" is meant not interferring with the vulcanization of the compositions or their storage stability.

The new compositions may also contain: up to 150 parts by weight, per 100 parts by weight of (A), of (C) a diorganopolysiloxane of the formula:

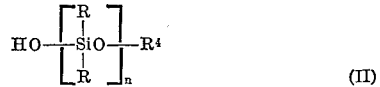

$$(R)_3SiO\!\left[\!\begin{array}{c}R\\|\\ \text{Si}\!-\!\text{O}\\|\\ R\end{array}\!\right]_{\!n'}\!\!Si(R)_3 \qquad (III)$$

in which the symbols R are as hereinbefore defined and $n'$ is an integer from 5 to 2000; up to 50 parts by weight, per 100 parts by weight of (A), of (D) an organopolysiloxane resin consisting of a succession of units of the formula:

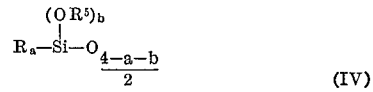

$$R_a\!-\!\overset{(OR^5)_b}{\underset{|}{Si}}\!-\!O_{\frac{4-a-b}{2}} \qquad (IV)$$

in which R is as hereinbefore defined, $R^5$ is hydrogen or the same as R, and $a$ and $b$ are each 0, 1, 2 or 3, $a+b$ being 1, 2 or 3, $a$ being preferably from 1 to 1.9 and $b$ from 0 to 0.5 on average; and up to 100 parts by weight, per 100 parts by weight of (A), of (E) a filler, pigment, adjuvant or mixture thereof.

It is to be understood that the diorganopolysiloxane (A), the crosslinking agent (B), the diorganopolysiloxane (C), and the organopolysiloxane resin (D) may each be a single compound or a mixture of compounds of the stated formulae.

The diorganopolysiloxane (A), which is a basic constituent of the new compositions may contain one or two Si—OH groups per molecule. Its viscosity, which is a function not only of the molecular weight but also of the nature of the substituents R, may vary between wide limits, and the compound may be very liquid to gummy in form. The substituents R may be more particularly saturated alkyl radicals having from 1 to 4 carbon atoms, such as methyl, ethyl, propyl or butyl; alkyl radicals substituted, for example, by halogen atoms or a cyano grouping, such as chloromethyl, trifluoropropyl, β-cyanoethyl or γ-cyanopropyl; alkenyl radicals having a single double bond such as the vinyl and allyl radicals; cycloaliphatic radicals optionally substituted by one or two halogen atoms such as cyclopropyl, cyclobutyl, cyclopentyl, cyclohexyl, dichlorocyclopropyl, fluorocyclobutyl or fluorocyclohexyl; phenyl optionally substituted by halogen atoms; alkylphenyl radicals such as tolyl, xylyl or cumenyl; and phenylalkyl radicals such as benzyl or phenylethyl, which are optionally substituted. Suitable diorganopolysiloxanes (A) include the (α,ω-dihydroxy)dimethylpolysiloxanes, the (α,ω-dihydroxy)methylphenylpolysiloxanes, the (α,ω-dihydroxy)methylethylpolysiloxanes, the (α,ω-dihydroxy) methylvinylpolysiloxanes, whose viscosities may range from 1000 to 2,000,000 cst. at 25° C., and preferably from 5000 to 250,000 cst., and the α-(hydroxy)-ω-(trimethylsiloxy)dimethylpolysiloxanes, the α-(hydroxy)-ω-(trimethylsiloxy)methylphenylpolysiloxanes and the α-(hydroxy) - ω - (diphenylmethylsiloxy)dimethylpolysiloxanes whose viscosities may range from 500 to 500,000 cst., and preferably from 1000 to 150,000 cst., at 25° C.

These diorganopolysiloxanes (A) are available on an industrial scale and are described more particularly in French Pats. Nos. 1,134,005; 1,198,749; 1,226,745; 1,276,619 and 1,370,884.

In the organotriaminosilane (B), $R^1$ may represent more particularly a radical such as 2,2,dichlorocyclopropyl, (2-methyl-3,3-dichlorocyclopropyl)methyl, (2,2-dichlorocyclopropyl)methyl, 2-methyl-3,3 - dichlorocyclopropyl, or 7,7-dichloro-3-dicyclo(4,1,0)heptyl. $R^2$ and $R^3$ may represent more particularly hydrogen, alkyl of 1 to 6 carbon atoms, e.g. methyl, ethyl, propyl, butyl, pentyl or hexyl, cyclohexyl, cyclohexenyl, phenyl, benzyl or tolyl, or $R^2$ and $R^3$ are linked to form with the indicated nitrogens an aziridino, a pyrrolidino, a piperidino, or morpholino nucleus.

The crosslinking agent (B) may be employed in proportions which may vary in accordance with the nature and the quantity of other constituents of the mixture and in accordance with the desired characteristics of the hardened products derived from these compositions. However, in order to ensure a good crosslinking, it is necessary that at least one mole of crosslinking agent (B) should be present for each gramme-equivalent of SiOH group of the diorganopolysiloxane (A). Quantities of more than one mole may be employed, but it is preferable not to exceed 4 moles if it is desired to obtain flexible elastomers.

The diorganopolysiloxane (C) may be from very fluid to gummy. Preferably, it is a liquid of viscosity from 15 to 10,000 cst. at 25° C. Examples of such polymers include $\alpha,\omega$-bis(trimethylsiloxy)dimethylpolysiloxanes, $\alpha,\omega$-bis(phenyldimethylsiloxy)dimethylpolysiloxanes and $\alpha,\omega$-bis(diphenylmethylsiloxy)dimethylpolysiloxanes. These polymers are produced on an industrial scale and their preparation is described more particularly in French Pats. Nos. 979,058 and 1,108,764.

The polymer (C) is employed in quantities ranging up to 150 parts to 100 parts of diorganopolysoiloxane (A). It is preferably employed when the polymer (A) has two SiOH groups per molecule, its main object being to act as a plasticising agent to reduce the modulus of the elastomers formed, i.e. the force necessary to produce a given elongation, for example 100%.

The resin (D) may be a liquid, a paste or a solid. Although it is advantageous to use liquid resins to facilitate their mixture with other constituents, solid resins may be incorporated with the aid of an organic diluent which is inert to the various constituents of the compositions of the invention.

The preparation of these resins (D), which is well known and described in, for example, French Pats. Nos. 950,681; 949,419, 1,032,662 and 1,042,915, may be effected by cohydrolysis of chlorosilanes, optionally in a solvent, followed by neutralisation and then by simultaneous rearrangement and polymerisation with the aid of an appropriate catalyst. As examples of such resins, there may be mentioned those which are obtained by cohydrolysis and cocondensation of methyltrichlorosilane, dimethyldichlorosilane and trimethylchlorosilane, or from trimethylchlorosilane and ethyl silicates. The starting monomers are generally mixed in a proportion such that the ratio R/Si is on average between 1 and 1.9 for the whole.

The resins (D) are introduced in quantities up to 50 parts per 100 parts of diorganopolysiloxane (A). Their use is particularly recommended when it is desired to produce thixotropic compositions for jointing vertical surfaces or for improving the adhesiveness of compositions which may thereafter be employed for special bonding operations.

Like known compositions vulcanisable at ambient temperature, the compositions of this invention may also comprise fillers, pigments and adjuvants; for example, they may contain reinforcing fillers such as silicas of combustion and precipitation having a large specific surface, which have optionally been treated with organosilicon compounds. Apart from these reinforcing fillers, they may contain diatomaceous silicas, ground quarts, talc, mica, clay, sand, lamp black, graphite, oxides of titanium, iron, magnesium, zinc, antimony and aluminium, and carbonates of calcium, magnesium and zinc. If desired, they may contain fibrous fillers such as absestos or glass fibre, as also metallic powders such as those based upon aluminium, tin, zinc and iron. Other fillers may also be incorporated, such as organic or mineral pigments, phthalocyanins, mineral semiorganic or organic polymers such as carboranes, phosphonitrile chlorides, polytetrafluoroethylene, polychlorotrifluoroethylene, polyvinyl chloride, polybenzimidazoles, polyimides, thixotropic products such as triglycerides of aliphatic long-chained carboxylic acids, solar ray filtering agents, oxidation inhibitors and dielectric materials. These fillers, pigments and adjuvants may be incorporated in the compositions of the invention in quantities up to 100 parts per 100 parts of diorganopolysiloxane (A). They may not only improve the mechanical properties of the elastomers formed, but also permit production of particular elastomers, for example electrically conductive elastomers or elastomers resistant to solvents, bacteria, flames, and very high or very low temperatures.

The use of the new crosslinking agents makes it possible to effect the hardening of the compositions in a few minutes without the use of catalysts. It is obvious that if instantaneous setting is desired, there may also be added to the previously defined composition one of the catalysts usually employed with compositions vulcanisable at ambient temperature. It is to be noted that in this case a quantity of catalyst distinctly smaller than that usually necessary for obtaining instantaneous setting of the compositions is sufficient to achieve this result.

The compositions of the invention may be prepared when required by simple mixing of the constituents by the usual methods of preparing compositions of this nature. However, when it is desired to prepare storage-stable compositions, it is necessary to mix the various constituents away from moisture. The constituents may be introduced in the preparation of the mixture in any order. However, it is preferable to proceed as follows: first to mix compound (A) and the other constituents except the crosslinking agent (B) in an appropriate receptacle, then to heat this mixture to a temperature of up to 200° C. and simultaneously to effect a flushing with a current of inert anhydrous gas such as nitrogen, the operation being carried out at atmospheric pressure or under a lower pressure, until all moisture is eliminated, and finally to cool the mixture and to introduce the crosslinking agent (B) and where necessary the catalysts, again under an anhydrous inert atmosphere. After vigorous intermixing of the whole by malaxation and grinding or by any other known mechanical means so as to obtain a completely homogeneous composition, the composition is packed in moisture-tight tubes or cartridges. The compositions thus prepared and packed can be perfectly preserved and may be employed with constant results after any period of storage.

It is also possible to include in the compositions a diluent which is inert to the constituents and does not interfere with the vulcanisation, either to introduce certain constituents more homogeneously, for example when the crosslinking agent is solid, or to prepare fluid compositions ready for use. Suitable diluents include the aromatic benzene hydrocarbons, optionally halogenated, such as benzene, toluene, xylene, monochlorobenzene, the petroleum ethers, white spirit, optionally halogenated aliphatic hydrocarbon derivatives such as hexane, heptane, trichloroethylene or tetrachloroethylene, the alicyclic hydrocarbons such as cyclohexane or methylcyclohexane, mainly aliphatic ethers such as ethyl ether and propyl, butyl and amyl ethers. A single solvent of a particular type or mixtures of solvents of the same type or of different types may be employed.

The compositions according to the invention, whether they be extemporaneously prepared compositions or compositions stable in storage, may be employed in many fields. They are suitable for the production of moulds in which organic resins such as polyesters may be cast, for the impregnation of paper and metal foils, for the production of optionally supported insulating tapes, for the bonding of the materials of any nature and for the production of composite assemblies, as also for the production of coatings. They are excellent materials for jointing slabs and pipes, for sealing, closure and expansion joints between the various parts of a building, for the coating of pavements and runways, and for the caulking of ships' decks and fissures which appear in the hulls of light boats.

They are also suitable for the production of films of very small thickness, which may be up to a few microns, by casting onto a support dispersions of the compositions of the invention in inert diluents, and then eliminating the diluents by heating and hardening of the film in atmospheric moisture. These films, which can readily be detached from the support after complete vulcanisation, may serve as membranes of selective permeability, for example for separating the constituents of gas mixtures. If a bonding underlayer is initially deposited upon a sheet-form support, there are obtained articles effectively coated with a thin layer of silicone elastomer which may be employed as separator sheets, notably in the rubber industry.

The crosslinking agents (B) of the formula $R^1Si(NR^2R^3)_3$ may be prepared by reacting together an amine of formula $HNR^2R^3$ and a chlorosilane of the formula $R^1SiCl_3$, which is itself obtained, for example, by the process described in the article by R. Müller and W. Müller [Chem. Ber. 98 2916–2919 (1965)]. At least three molecular proportions of the amine should be used and preferably enough in addition to neutralize the hydrogen chloride which forms.

The following examples illustrate the invention.

EXAMPLE 1

Into a four-necked round-bottomed flask provided with a stirrer, a condenser, a 250 cc. dropping funnel and a thermometer are introduced:

166.5 g. of triethylamine (1.65 mole),
120.5 g. of butylamine (1.65 mole), and
2000 cc. of heptane.

122.5 g. of (2,2-dichlorocyclopropyl)trichlorosilane (0.5 mole) are introduced into the dropping funnel, and the contents of the funnel are passed into the flask in 25 minutes, a temperature of 40–45° C. being maintained. When the running-in is complete, the mixture is heated under reflux for 2 hours 30 minutes (the temperature in the mass being 97° C.). The contents of the flask are then cooled and filtered under an anhydrous nitrogen atmosphere, and the triethylamine hydrochloride precipitate is washed with 2× 250 cc. of anhydrous heptane.

The heptane is driven off under reduced pressure (30 mm. Hg), and the residue is distilled. 136 g. of slightly coloured oil are obtained having the following characteristics:

B.P.—126–130° C./0.1–0.08 mm. Hg
$n_D^{20}$—1.4720
$d_4^{20}$—1.0095

It is (2,2-dichlorocyclopropyl)-tris(n-butylamino)silane.

EXAMPLE 2

Into a glass reactor provided with a stirrer, a gas inlet and a gas outlet, and a heating device are introduced:

100 g. of ($\alpha,\omega$-dihydroxy)dimethylpolysiloxane oil having a viscosity of 19,000 cst. (centistokes) at 25° C., of which the hydroxyl group content is 0.1%.

5 g. of silica of combustion having a large specific surface ("Aerosil" brand), and 25 g. of diatomaceous silica ("Celite Superfloss" brand). These materials are intimately mixed at ambient temperature (25° C.), and the volatile constituents are then removed by heating at 150° C. under a current of anhydrous nitrogen for 2 hours. After cooling, 4.85 g. of (2,2-dichlorocyclopropyl)-tris(n-butylamino)silane are incorporated into the mixture (M) obtained. The whole is vigorously stirred and the composition thus obtained is stored away from moisture in a fluid-tight receptable, all these operations being carried out under an anhydrous nitrogen atmosphere.

By way of comparison, a composition according to the prior art is prepared by incorporating 3.55 g. of methyltris(n-butylamino)-silane into the mixture (M).

Part of both compositions is spread on a glass plate previously coated with an anti-adhesion agent (an aqueous solution of the sodium salt of the sulphuric semiester of a long-chained aliphatic secondary monoalcohol, marketed under the trade name "Teepol"). The deposited layer (thickness 1.5 to 2 mm.) is left in the ambient air (humidity about 50%, temperature about 25° C.), and the time taken for it to set on the surface, i.e. the time by which the surface of the layer is no longer sticky and does not adhere to an object coming into contact therewith, is observed.

In addition, the following determinations are made on the films obtained after complete solidification (48 hours):

Shore A hardness (standard ASTM D 676–59 T)
Breaking strength (RR) [standard AFNOR T 46 002 (dumb-bells H3)].
Elongation percent (A) [standard AFNOR T 46 002 (dumb-bells H3)].

The results of these measurements and the surface setting times are set out in the following table:

| Compositions | Mechanical properties | | | Surface setting time, minute |
|---|---|---|---|---|
| | Shore A hardness | RR, kg./cm.² | A% | |
| Mixture M +  | 47 | 38 | 270 | 12 |
| Mixture M + CH₃Si(NHC₄H₉)₃ | 45 | 31 | 230 | 35 |

The appearance of the unused product which is kept in a fluid-tight tube remains unchanged after storage for one year, and the elastic films which it then gives on exposure to moisture have characteristics substantially the same as those appearing in the foregoing table.

EXAMPLE 3

4.6 g. of (2,2-dichlorocyclopropyl)-tris(n-butylamino) silane and 28 g. of cyclohexane are incorporated into a mixture of 100 g. of an ($\alpha,\omega$-dihydroxy)dimethylpolysiloxane oil having a viscosity of 18,000 cst. at 25° C. and 8 g. of silica of combustion ("Aerosil" brand). The whole is intimately mixed and the composition is employed to prepare a film by the procedure described in Example 2. The determinations made as before give the following results:

Surface setting time—5 min.
After 2 days:
    Shore A hardness—37
    RR kg./cm.²—15
    A percent—240

EXAMPLE 4

7.5 g. of (2,2-dichlorocyclopropyl)-tris(n-butylamino) silane are incorporated into the mixture formed of the following constituents:

100 g. of an ($\alpha,\omega$-dihydroxy)dimethylpolysiloxane oil having a viscosity of 106,000 cst. at 25° C., the hydroxyl group content of which is 0.08% by weight, 16 g. of a resin consisting of units of formulae $CH_3SiO_{1.5}$ (0.35 mole), $(CH_3)_2SiO$ (1 mole) and $(CH_3)_3Si_{0.5}$ (0.035 mole) having a viscosity of 75 cst. at 25° C. and containing about 0.8% by weight of hydroxyl groups, 5 g. of a silica of combustion treated with octamethylcyclotetrasiloxane, 7.5 g. of a silica of combustion having a large specific surface ("Aerosil" brand), and 1 g. of titanium dioxide (anatase form).

After treatment as in Example 2, the following results are obtained:

Surface setting time—8 min.
After 2 days:
  Shore A hardness—26
  RR kg./cm.$^2$—25
  A percent—550

We claim:
1. An aminosilane of the formula:

$$R^1Si(NR^2R^3)_3$$

where $R^1$ is 2,2-dichlorocyclopropyl, (2-methyl-3,3-dichlorocyclopropyl)methyl, (2,2 - dichlorocyclopropyl)methyl, 2 - methyl - 3,3-dichlorocyclopropyl, or 7,7-dichloro-3-dicyclo(4,1,0)heptyl, and $R^2$ and $R^3$ are the same or different and are hydrogen or alkyl of 1 to 6 carbon atoms, cyclohexyl, cyclohexenyl, phenyl, benzyl or tolyl.

2. 2,2-dichlorocyclopropyl-tris(n-butylamino)silane.

References Cited

UNITED STATES PATENTS

| | | | |
|---|---|---|---|
| 3,036,019 | 5/1962 | Molotsky et al. | 260—448.2X |
| 3,043,798 | 7/1962 | Boyer et al. | 260—448.2X |
| 3,133,110 | 5/1964 | Morehouse et al. | 260—448.2(N) |
| 3,445,425 | 5/1969 | Speier | 260—448.2X |

TOBIAS E. LEVOW, Primary Examiner

P. F. SHAVER, Assistant Examiner

U.S. Cl. X.R.

106—38.2; 260—37, 825, 46.5, 448.2R